United States Patent
Gong

(10) Patent No.: US 9,778,440 B2
(45) Date of Patent: Oct. 3, 2017

(54) OPTICAL SYSTEM HAVING SMALL PERSPECTIVE DISTORTION AND ULTRA-WIDE VIEWING ANGLE

(71) Applicant: Union Optech Co., Ltd., Zhongshan (CN)

(72) Inventor: Junqiang Gong, Zhongshan (CN)

(73) Assignee: UNION OPTECH CO., LTD., Zhongshan (CN)

( * ) Notice: Subject to any disclaimer, the term of this patent is extended or adjusted under 35 U.S.C. 154(b) by 118 days.

(21) Appl. No.: 14/963,211

(22) Filed: Dec. 8, 2015

(65) Prior Publication Data

US 2016/0363740 A1 Dec. 15, 2016

(30) Foreign Application Priority Data

Jun. 12, 2015 (CN) .......................... 2015 1 0323515

(51) Int. Cl.
| | |
|---|---|
| *G02B 13/00* | (2006.01) |
| *G02B 27/00* | (2006.01) |
| *G02B 9/64* | (2006.01) |
| *G02B 3/04* | (2006.01) |
| *G02B 13/18* | (2006.01) |

(52) U.S. Cl.
CPC .......... *G02B 13/0045* (2013.01); *G02B 9/64* (2013.01); *G02B 27/0025* (2013.01); *G02B 3/04* (2013.01); *G02B 13/002* (2013.01); *G02B 13/18* (2013.01)

(58) Field of Classification Search
CPC .... G02B 9/64; G02B 13/002; G02B 13/0045; G02B 13/18; G02B 3/04
See application file for complete search history.

(56) References Cited

U.S. PATENT DOCUMENTS

| | | | | |
|---|---|---|---|---|
| 9,442,277 | B1* | 9/2016 | Shih ...................... | G02B 13/06 |
| 9,494,772 | B1* | 11/2016 | Hudyma ................ | G02B 13/06 |
| 2015/0241666 | A1* | 8/2015 | Koida .................... | G02B 13/04 |
| | | | | 359/713 |
| 2016/0202452 | A1* | 7/2016 | Kuo ...................... | G02B 13/04 |
| | | | | 359/708 |

\* cited by examiner

*Primary Examiner* — Bumsuk Won
*Assistant Examiner* — Ephrem Mebrahtu
(74) *Attorney, Agent, or Firm* — Matthias Scholl, PC; Matthias Scholl

(57) ABSTRACT

An optical system, including, sequentially from an object side to an image side: a first lens; a second lens; a third lens; an aperture; a fourth lens; a fifth lens; a sixth lens; a seventh lens; an optical filter; and a photosensitive chip. The first lens is a meniscus aspherical lens. The second lens is a meniscus aspherical lens. The third lens is a biconvex aspherical lens. The fourth lens is a meniscus aspherical lens. The fifth lens is a meniscus spherical lens. The sixth lens is a meniscus spherical lens. The seventh lens is a biconvex aspherical lens.

5 Claims, 2 Drawing Sheets

OPTICAL SYSTEM HAVING SMALL PERSPECTIVE DISTORTION AND ULTRA-WIDE VIEWING ANGLE

CROSS-REFERENCE TO RELATED APPLICATIONS

Pursuant to 35 U.S.C. §119 and the Paris Convention Treaty, this application claims the benefit of Chinese Patent Application No. 201510323515.X filed Jun. 12, 2015, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to an optical system, and more particularly to an optical system with small perspective distortion and an ultra-wide angle.

Description of the Related Art

At present, optical camera lenses for use in cars or conferences generally have the following disadvantages: large lens distortion, large perspective distortion, low resolution, insufficient field angle, and the like.

Perspective distortion refers to a scenario in which obvious dissymmetry occurs in images at edges during photographing a three-dimensional object. For example, as shown in FIG. 2, according to basic principles of imaging, when imaging a square frame AE, the AE is in the same plane; a midpoint of AE is set as O, so its projection A'E' is also equally divided by a midpoint O'. Therefore, a proportion relation appears to be correct and symmetrical. However, for a three-dimensional object such as a sphere (as shown in FIG. 3), although a sphere is circularly symmetrical, at edges of a field, AB is projected and imaged to be A'B' for the sphere during projection imaging. The physical length corresponding to AO is CO, and the physical length corresponding to BO is DO. Although CO and DO are both equal to a radius of the sphere, for the projections of CO and DO, BO is far greater than AO; and the asymmetric effect becomes more obvious at a further edge of the field, and further in the projected image, B'O' is also greater than A'O'.

SUMMARY OF THE INVENTION

In view of the above-described problems, it is one objective of the invention to provide an optical system having a small-perspective distortion and an ultra-wide viewing angle.

To achieve the above objective, in accordance with one embodiment of the invention, there is provided an optical system with small-perspective distortion and an ultra-wide angle. The optical system comprises sequentially from an object side to an image side: a first lens; a second lens; a third lens; an aperture; a fourth lens; a fifth lens; a sixth lens; a seventh lens; an optical filter; and a photosensitive chip. The first lens is critically a meniscus aspherical lens. The second lens is critically a meniscus aspherical lens. The third lens is critically a biconvex aspherical lens. The fourth lens is critically a meniscus aspherical lens. The fifth lens is critically a meniscus spherical lens. The sixth lens is critically a meniscus spherical lens. The seventh lens is critically a biconvex aspherical lens.

In a class of this embodiment, surfaces of the first lens that face towards the object side and the image side are both oblate aspherical surfaces; a surface of the second lens that faces towards the object side is a hyperbolic aspherical surface and a surface of the second lens that faces towards the image side is an oval aspherical surface; a surface of the third lens that faces towards the object side is a hyperbolic aspherical surface and a surface of the third lens that faces towards the image side is an oblate aspherical surface; a surface of the fourth lens that faces towards the object side is an oblate aspherical surface and a surface of the fourth lens that faces towards the image side is a hyperbolic aspherical surface; and a surface of the seventh lens that faces towards the object side is an oblate aspherical surface and a surface of the seventh lens that faces towards the image side is an oval aspherical surface.

In a class of this embodiment, a focal power of the first lens is negative and a concave of the first lens faces towards the image side; a focal power of the second lens is negative and a concave of the second lens faces towards the image side; a focal power of the third lens is positive; a focal power of the fourth lens is positive and a concave of the fourth lens faces towards the object side; a focal power of the fifth lens is negative and a concave of the fifth lens faces towards the object side; a focal power of the sixth lens is positive; and a focal power of the seventh lens is positive.

In a class of this embodiment, the first lens, the second lens, the third lens, and the seventh lens are all optical plastic; the fourth lens, the fifth lens, and the sixth lens are all optical glass, and the fifth lens and the sixth lens are glued together by an optical glue.

In a class of this embodiment, shapes of aspherical surfaces of the first lens, the second lens, the third lens, the fourth lens, and the seventh lens satisfies the equation below:

$$Z = cy^2 / \{1 + \sqrt{[1-(1+k)c^2y^2]}\} + \alpha_1 y^2 + \alpha_2 y^4 + \alpha_3 y^6 + \alpha_4 y^8 + \alpha_5 y^{10} + \alpha_6 y^{12} + \alpha_7 y^{14} + \alpha_8 y^{16},$$

in the equation, a parameter c is a curvature corresponding to a radius, y is a radial coordinate, and k is a coefficient of a conic curve of second order; when the coefficient k is smaller than $-1$, the curve of surface shape of the lens is a hyperbolic curve; when the coefficient k is equal to $-1$, the curve of surface shape of the lens is a parabola; when the coefficient k is between $-1$ and 0, the curve of surface shape of the lens is an oval; when the coefficient k is equal to 0, the curve of surface shape of the lens is a circle; when the coefficient k is greater than 0, the curve of surface shape of the lens is an oblateness; and $\alpha_1$ to $\alpha_8$ represent coefficients corresponding to the radical coordinates, respectively.

As compared with the prior art, the optical system according to embodiments of the invention has the following advantages:

1. In the invention, the field angle is very large and the distortion is very small. The pillow-like anamorphose, the barrel-like anamorphose, and the linear anamorphose tends not to occur.
2. The perspective distortion of the invention is very small. During photographing a three-dimensional object, obvious asymmetric deformation tends not to occur in off-axis images.
3. The optical system has a very low cost and small temperature drift, and is capable of imaging clearly in a severe environment such as high and low temperatures.
4. The optical system has a large aperture, a high resolution, and has a clear and authentic image. A whole picture thereof is bright and well-distributed.
5. The optical system has a simple structure and a low cost, and is suitable for promotion.

DETAILED DESCRIPTION OF THE EMBODIMENTS

Figure 1:
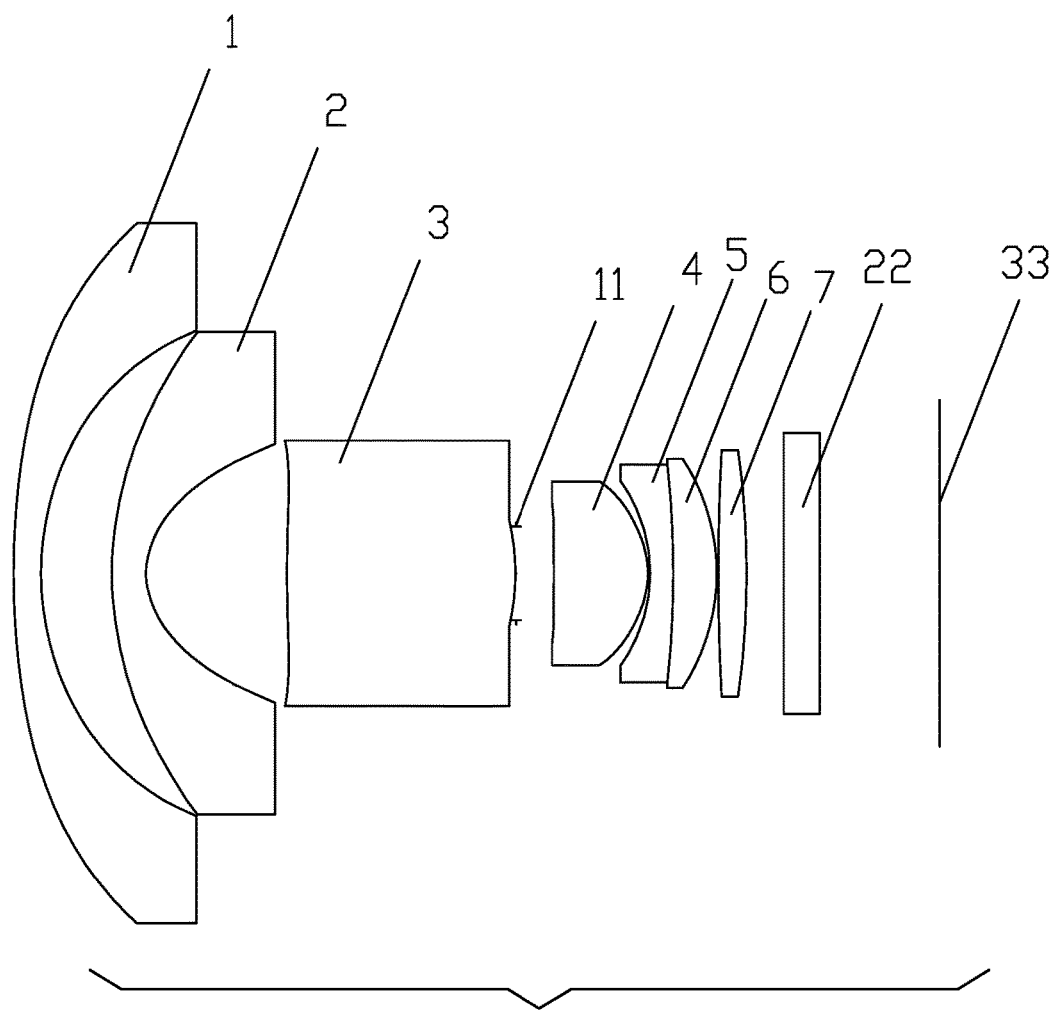
FIG. 1 is a schematic diagram of an optical system with small-perspective distortion and an ultra-wide angle in accordance with one embodiment of the invention.
Figure 2:
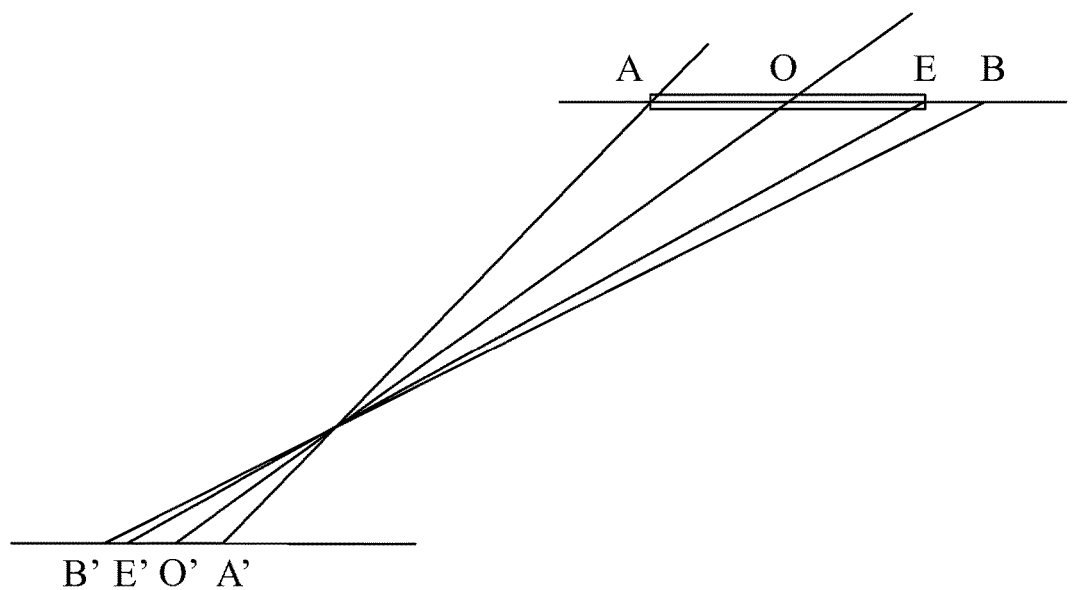
FIG. 2 is a schematic diagram showing imaging principles of an optical system in the prior art.
Figure 3:
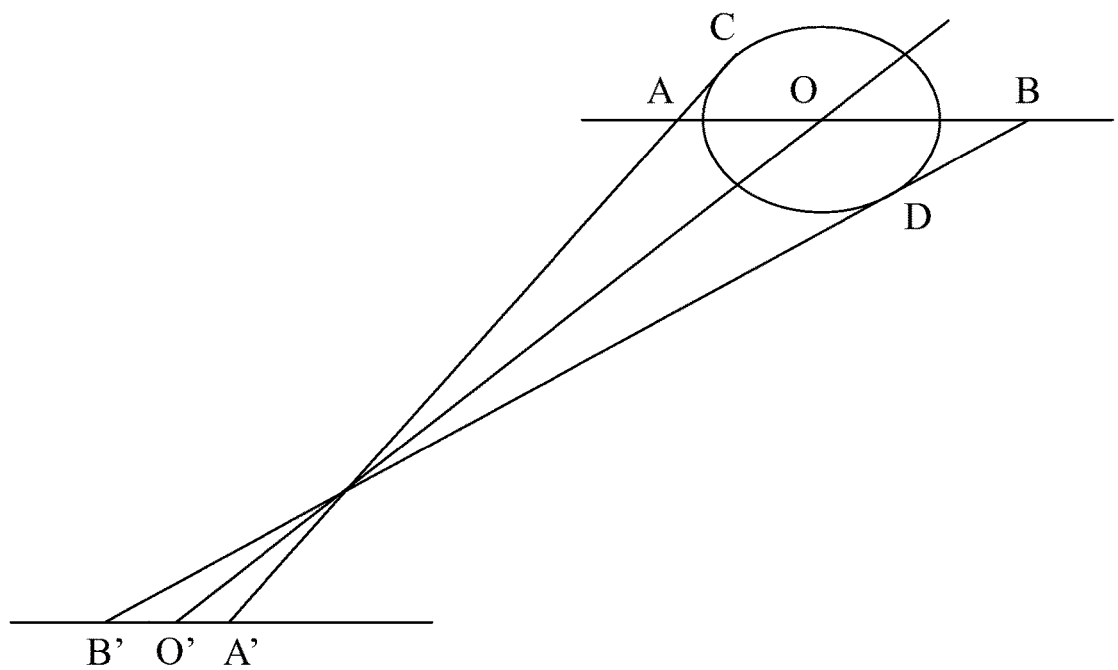
FIG. 3 is a schematic diagram showing principles of occurrence of perspective distortion for an optical system in the prior art.

For further illustrating the invention, experiments detailing an optical system with small-perspective distortion and an ultra-wide angle are described below. It should be noted that the following examples are intended to describe and not to limit the invention.

An optical system with small-perspective distortion and an ultra-wide angle is characterized by comprising sequentially from an object side to an image side:

a first lens 1, the first lens 1 is a meniscus aspherical lens;

a second lens 2, the second lens 2 is a meniscus aspherical lens;

a third lens 3, the third lens 3 is a biconvex aspherical lens;

an aperture 11;

a fourth lens 4, the fourth lens 4 is a meniscus aspherical lens;

a fifth lens 5, the fifth lens 5 is a meniscus spherical lens;

a sixth lens 6, the sixth lens 6 is a meniscus spherical lens;

a seventh lens 7, the seventh lens 7 is a biconvex aspherical lens;

an optical filter 22; and a photosensitive chip 33.

Surfaces of the first lens 1 that face towards the object side and the image side are both oblate aspherical surfaces. A surface of the second lens 2 that faces towards the object side is a hyperbolic aspherical surface and a surface of the second lens 2 that faces towards the image side is an oval aspherical surface. A surface of the third lens 3 that faces towards the object side is a hyperbolic aspherical surface and a surface of the third lens 3 that faces towards the image side is an oblate aspherical surface. A surface of the fourth lens 4 that faces towards the object side is an oblate aspherical surface and a surface of the fourth lens 4 that faces towards the image side is a hyperbolic aspherical surface. A surface of the seventh lens 7 that faces towards the object side is an oblate aspherical surface and a surface of the seventh lens 7 that faces towards the image side is an oval aspherical surface.

A focal power of the first lens 1 is negative and a concave of the first lens 1 faces towards the image side. A focal power of the second lens 2 is negative and a concave of the second lens 2 faces towards the image side; a focal power of the third lens 3 is positive. A focal power of the fourth lens 4 is positive and a concave of the fourth lens 4 faces towards the object side. A focal power of the fifth lens 5 is negative and a concave of the fifth lens 5 faces towards the object side. A focal power of the sixth lens 6 is positive; and a focal power of the seventh lens 7 is positive. The first lens 1 and the second lens 2 both use a meniscus aspherical lens to reduce a change angle of light refraction between the lenses as much as possible. In this way, light with a large angle that enters the optical system can be well refracted by the first lens 1 and the second lens 2. The third lens 3 uses a comparatively thick biconvex aspherical lens to enable the light to smoothly enter the optical system behind the third lens 3, thereby effectively enlarging a field angle of the optical system. Because the focal powers of the first lens 1 and the second lens 2 are both negative and a curvature of the surface of the second lens 2 that faces towards the image side is very large, comparatively large distortion is generated in the optical system and exactly offsets with positive distortion are generated on the surface of the second lens 2 that faces towards the object side, thereby reducing the distortion of the optical system and the perspective distortion. The third lens 3 uses a comparatively thick aspherical surface having a positive focal power, which can effectively correct the perspective distortion. Meanwhile, by using the characteristic that symmetry of the system on two sides of the aperture can reduce distortion to a maximum limit, the aperture 11 is disposed in a center of the present optical system, so that small perspective distortion is achieved by the system, and an off-axis object may not generate obvious asymmetric deformation during photographing a three-dimensional object.

The first lens 1, the second lens 2, the third lens 3, and the seventh lens 7 are all optical plastic; the fourth lens 4, the fifth lens 5, and the sixth lens 6 are all optical glass; and the fifth lens 5 and the sixth lens 6 are glued together by using an optical glue. The optical system uses a combination of glass lenses and plastic lenses. In the system, four plastic lenses are used. By using the characteristic that a plastic material being cheap, the cost of the whole optical system can be reduced effectively. By using the characteristic that a glass material being stable, a glass aspherical lens such as the fourth lens 4 is used behind the aperture 11, to reduce sensibility to temperature of the optical system, so as to enable the optical system to also operate normally in a severe environment.

The fourth lens 4 uses a meniscus, aspherical glass lens. The surface of the fourth lens 4 that faces towards the object side is an oblate aspherical surface and the surface of the fourth lens 4 that faces towards the image side is a hyperbolic aspherical surface. The fourth lens 4 is made from extra-low dispersion glass, close to the aperture 11, and capable of well correcting on-axis aberration of the optical system. The fifth lens 5 is made from a high-dispersion material, the sixth lens 6 is made from a low dispersion material, and the fifth lens 5 and the sixth lens 6 are glued together for use, which can not only correct the on-axis aberration of the optical system, but also correct vertical-axis color difference of the optical system. The seventh lens is an aspherical plastic lens, capable of correcting the system curvature of field and astigmatism. In the optical system, the glass and the plastic are used in combination and aspherical surfaces are used in a plurality of positions, thereby effectively solving various problems of aberration balancing such as the color difference and the curvature of field, so as to enable edges of an image plane to have a comparatively high resolution as well when enabling a center of the image plane to have a high resolution. In addition, the optical filter 22 is disposed behind the seventh lens 7. The optical filter 22 can filter parasitic light, so that the whole image plane to be well-distributed and bright, and at the same time the colors of the image plane are bright. The optical system has a good color reductive property.

The shape of aspherical surfaces of the first lens 1, the second lens 2, the third lens 3, the fourth lens 4, and the seventh lens 7 satisfies the equation below:

$$Z = cy^2/\{1+\sqrt{[1-(1+k)c^2y^2]}\} + \alpha_1 y^2 + \alpha_2 y^4 + \alpha_3 y^6 + \alpha_4 y^8 + \alpha_5 y^{10} + \alpha_6 y^{12} + \alpha_7 y^{14} + \alpha_8 y^{16},$$

in the equation, a parameter c is a curvature corresponding to a radius, y is a radial coordinate, and k is a coefficient of a conic curve of second order; when the coefficient k is smaller than −1, the curve of surface shape of the lens is a hyperbolic curve, and when the coefficient k is equal to −1, the curve of surface shape of the lens is a parabola; when the coefficient k is between −1 and 0, the curve of surface shape of the lens is an oval; when the coefficient k is equal to 0, the curve of surface shape of the lens is a circle; when the coefficient k is greater than 0, the curve of surface shape of the lens is an oblateness; and $\alpha_1$ to $\alpha_8$ represent coefficients corresponding to the radical coordinates, respectively.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An optical system, comprising, sequentially from an object side to an image side:
    a) a first lens;
    b) a second lens;
    c) a third lens;
    d) an aperture;
    e) a fourth lens;
    f) a fifth lens;
    g) a sixth lens;
    h) a seventh lens;
    i) an optical filter; and
    j) a photosensitive chip;
wherein
    the first lens is a meniscus aspherical lens;
    the second lens is a meniscus aspherical lens;
    the third lens is a biconvex aspherical lens;
    the fourth lens is a meniscus aspherical lens;
    the fifth lens is a meniscus spherical lens;
    the sixth lens is a meniscus spherical lens; and
    the seventh lens is a biconvex aspherical lens.

2. The system of claim 1, wherein surfaces of the first lens that face towards the object side and the image side are both oblate aspherical surfaces; a surface of the second lens that faces towards the object side is a hyperbolic aspherical surface and a surface of the second lens that faces towards the image side is an oval aspherical surface; a surface of the third lens that faces towards the object side is a hyperbolic aspherical surface and a surface of the third lens that faces towards the image side is an oblate aspherical surface; a surface of the fourth lens that faces towards the object side is an oblate aspherical surface and a surface of the fourth lens that faces towards the image side is a hyperbolic aspherical surface; and a surface of the seventh lens that faces towards the object side is an oblate aspherical surface and a surface of the seventh lens that faces towards the image side is an oval aspherical surface.

3. The system of claim 1, wherein a focal power of the first lens is negative and a concave of the first lens faces towards the image side; a focal power of the second lens is negative and a concave of the second lens faces towards the image side; a focal power of the third lens is positive; a focal power of the fourth lens is positive and a concave of the fourth lens faces towards the object side; a focal power of the fifth lens is negative and a concave of the fifth lens faces towards the object side; a focal power of the sixth lens is positive; and a focal power of the seventh lens is positive.

4. The system of claim 1, wherein the first lens, the second lens, the third lens, and the seventh lens are all optical plastic; and the fourth lens, the fifth lens, and the sixth lens are all optical glass, and the fifth lens and the sixth lens are glued together by an optical glue.

5. The system of claim 1, wherein shapes of aspherical surfaces of the first lens, the second lens, the third lens, the fourth lens, and the seventh lens each satisfy the equation below:

$$Z=cy^2/\{1+\sqrt{[1-(1+k)c^2y^2]}\}\alpha_1y^2+\alpha_2y^4+\alpha_3y^6+\alpha_4y^8+\alpha_5y^{10}+\alpha_6y^{12}+\alpha_7y^{14}+\alpha_8y^{16},$$

where
    c is a curvature corresponding to a radius,
    y is a radial coordinate, and
    k is a coefficient of a conic curve of second order;
    $\alpha_1$ to $\alpha_8$ represent coefficients corresponding to radical coordinates;
    when the coefficient k is smaller than −1, a curve of surface shape of the lens is a hyperbolic curve, and when the coefficient k is equal to −1, the curve of surface shape of the lens is a parabola; when the coefficient k is between −1 and 0, the curve of surface shape of the lens is oval; when the coefficient k is equal to 0, the curve of surface shape of the lens is a circle, and when the coefficient k is greater than 0, the curve of surface shape of the lens is an oblateness.

* * * * *